United States Patent [19]
Yamada

[11] Patent Number: 5,359,864
[45] Date of Patent: Nov. 1, 1994

[54] COOLING APPARATUS
[75] Inventor: Yasuo Yamada, Isesaki, Japan
[73] Assignee: Sanden Corp., Isesaki, Japan
[21] Appl. No.: 85,323
[22] Filed: Jun. 29, 1993
[30] Foreign Application Priority Data Jun. 30, 1992 [JP] Japan .................................. 4-173186
Jul. 30, 1992 [JP] Japan .................................. 4-203732

[51] Int. Cl.⁵ ............................................. F25B 17/08
[52] U.S. Cl. ........................................ 62/480; 62/430; 62/476; 62/529
[58] Field of Search .................. 62/430, 476, 530, 529, 62/59, 480, 239; 165/104.17, 902

[56] References Cited

U.S. PATENT DOCUMENTS

| | | | |
|---|---|---|---|
| 356,210 | 1/1887 | Richmond | 62/59 |
| 671,399 | 4/1901 | Miskolczy | 62/530 |
| 2,702,990 | 3/1955 | Kogel et al. | 62/430 |
| 3,257,817 | 6/1966 | Leonard | 62/59 |
| 3,773,031 | 11/1973 | Laing et al. | 126/400 |
| 4,205,656 | 6/1980 | Scarlata | 126/400 |
| 4,827,735 | 5/1989 | Foley | 62/430 |
| 4,856,296 | 8/1989 | Shu | 62/430 |
| 4,924,935 | 5/1990 | Van Winckel | 165/10 |
| 4,951,739 | 8/1990 | Cates et al. | 165/10 |
| 5,036,904 | 8/1991 | Kanda et al. | 165/10 |

FOREIGN PATENT DOCUMENTS 139098  1/1987  Japan .

OTHER PUBLICATIONS

"A Study of Dual Zeolite-Water Absorption System For Automotive Air Conditioning" International Symposium on Automotive Technology and Automation Jun. 1–5 1992.

Primary Examiner—Henry A. Bennet
Assistant Examiner—William C. Doerrler
Attorney, Agent, or Firm—Kenjiro Hidaka

[57] ABSTRACT

A cooling apparatus has a cooling vessel, containing a liquid as a thermal medium which absorbs latent heat by evaporation, and an absorber which absorbs the vapor of the liquid. The cooling vessel further contains one or more units of encapsulated gel refrigerant submerged in the liquid, which impede temperature increase of the liquid when an operation of the cooling apparatus is temporarily suspended. An alternative cooling vessel has one or more upwardly extending members partially submerged in the liquid and covered with liquid soaking material, so that the liquid soaks up in the material by capillary action and accelerates its evaporation. Another alternative cooling vessel has plural liquid tanks, one arranged on another, so that the total area for the evaporation of the liquid is multiplied. An additional alternative cooling vessel has a plurality of rotatable fins, partially submerged in the liquid, for accelerating the evaporation of the liquid.

2 Claims, 12 Drawing Sheets

FIG. 4

| First Adsorber | | Valves | | | | | Second Adsorber | |
|---|---|---|---|---|---|---|---|---|
| Process | Phase | V1 | V3 | V5 | V4 | V2 | Phase | Process |
| Adsorption | C'→D | X | X | O | X | X | A'→B | Desorption |
| | D→A | O | X | O | O | X | B→C | |
| Intermediate | — | X | O | X | O | X | — | Intermediate |
| Desorption | A'→B | X | X | O | X | X | C'→D | Adsorption |
| | B→C | X | O | O | X | O | D→A | |
| Intermediate | — | X | O | X | O | X | — | Intermediate |

O: Open　　X: Close

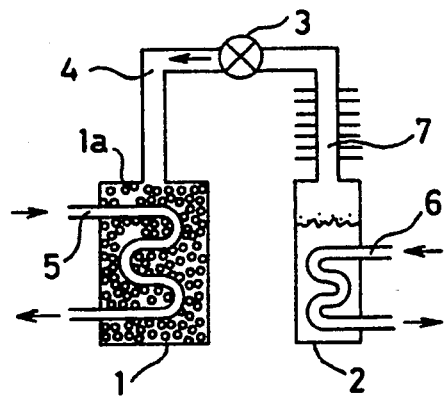
F I G. 2 0 (a)
(PRIOR ART)
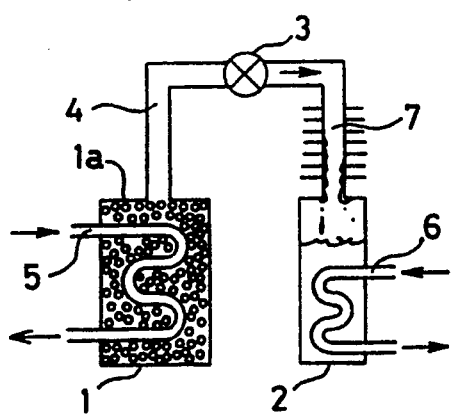
F I G. 2 0 (b)
(PRIOR ART)
F I G. 2 1 (PRIOR ART)
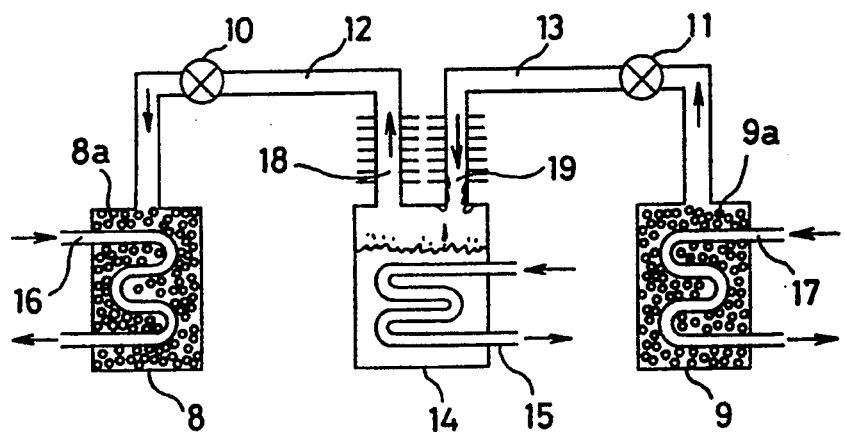

COOLING APPARATUS

BACKGROUND OF THE INVENTION

1. Field of the Invention

The present invention relates to a cooling apparatus, particularly a cooling apparatus having an improved cooling vessel. The cooling apparatus is used for an air-conditioning apparatus for automobiles, vessels, or residences, or in cooling apparatus of shipping containers for food products or medical products that require refrigeration.

2. Description of the Prior Art

Prior known cooling apparatuses for air-conditioning or refrigeration include a well-known heat pump system and, more recently, an adsorption system that uses adsorbents such as zeolite.

The prior technology is exemplified by what is described in Japanese Laid-Open Patent Application 61-139098, filed Jun. 14, 1986, Laid-Open No. 62-5060, laid-open Jan. 12, 1987, priority being claimed on German Patent Application P3521484.8, filed Jun. 14, 1985.

The present applicant has disclosed in a copending U.S. application Ser. No. 08/066,984 filed May 25, 1993, an improved adsorption-type cooling system.

FIG. 20(a) and FIG. 20(b) illustrate a basic principle of a prior known single-adsorber type adsorption cooling system. In FIG. 20(a), an adsorber 1 is connected with a cooling vessel 2 by a tubular passage 4 having a shutoff valve 3. The adsorber 1 houses adsorbent 1a such as zeolite, and a heat exchange pipe 5 that is in contact with the adsorbent 1a. The cooling vessel 2 contains water as an adsorption medium (adsorbate) which is in thermal contact with a cooling pipe 6. The air which is to be cooled is circulated through the cooling pipe 6. The adsorber 1, the cooling vessel 2 and the tubular passage 4 constitute a closed system which is evacuated of air. A condenser 7 for exchanging heat with the ambient air is provided on the tubular passage 4 near the cooling vessel 2.

With this cooling system, when the valve 3 is opened, the water inside the cooling vessel 2 evaporates into water vapor and flows through the tubular passage 4, in the direction shown by the arrow, into the adsorber 1 to be adsorbed by the adsorbent 1a by its adsorption action. Because of this, when the water in the cooling vessel 2 evaporates, the latent heat is adsorbed in the cooling vessel 2, so that the temperature in the cooling vessel 2 declines so as to cool the air inside the cooling pipe 6. This operation is called an adsorption process.

Next, an explanation will be made on the operation whereby the water adsorbed by the adsorbent 1a is returned to the cooling vessel 2.

Referring to FIG. 20(b), a high temperature gas from an external heat source is provided through the heat exchange pipe 5 to heat the adsorbent 1a and thereby desorb and separate the water adsorbed in it. Then, the separated water in a state of vapor is driven through the tubular passage 4, in the direction shown by the arrow, to the condenser 7, where the water vapor becomes liquid water and is recovered in the cooling vessel 2. This operation is called a desorption process.

The adsorption here means a state where the water molecules are retained among the molecules of the adsorbent. Reversely, in the desorption action, the water molecules are desorbed and separated from the molecules of the adsorbent as the adsorbent is heated.

However, the single-adsorber type adsorption cooling system described above is incapable of continuous cooling because the adsorption process and the desorption process must be done alternately in the same system. With this in mind, a dual-adsorber type adsorption cooling system as shown in FIG. 16 has been proposed.

In FIG. 21, two adsorbers 8, 9 are individually connected to a single cooling vessel 14 by tubes 12, 13, which respectively have shutoff valves 10, 11. The water in the cooling vessel 14 is thermally contacted by a cooling pipe 15 in the same manner as in the case of the single-adsorber type adsorption cooling system described above. Adsorbents 8a, 9a in the adsorbers 8, 9 are also in thermal contact with heat exchange pipes 16, 17, respectively, and condensers 18, 19 are provided on the tubes 12, 13, respectively.

With this cooling system, while the adsorption process is performed at one adsorber, at, for example, the adsorber 8, the desorption process is simultaneously performed at the other adsorber 9. Then, the two adsorbers 8, 9 carry out a switching operation whereby they work in reverse when their respective processes have been completed. Since the adsorber 9 is at high temperature when the desorption operation has been completed, low or ambient temperature air is provided through the heat exchange pipe 17 to cool the adsorbent 9a. Continuous cooling in the cooling vessel 14 is thus made possible by periodically repeating such operation.

(Problems to be Resolved)

With an adsorption type cooling system as described above, when the operation of the cooling system is temporarily suspended the cooling action in the cooling vessel by the evaporation of the water will be stopped. And the temperature of the water in the cooling vessel will rise if the operation is suspended for a while. This will result in an ineffective cooling when the system resumes operation. By increasing the quantity of the water in the cooling vessel, the thermal capacity retained by the cooling vessel will be increased. However, the greater thermal capacity is translated to a longer rise time at the first operation of the cooling apparatus and an increase of its size.

In order to increase the cooling effect, the evaporation rate of the water must also be increased. However, increasing the surface area of the water to obtain an increased rate of evaporation will result in an increase in the size of the cooling vessel.

SUMMARY OF THE INVENTION

The present invention was accomplished with a view to the above described problem.

An object of the present invention is to provide a cooling apparatus having a sufficient cooling effect from the start of the operation after the operation of the cooling apparatus has been temporarily suspended.

Another object of the present invention is to provide a cooling apparatus having a cooling vessel in which the evaporation surface area of the liquid is increased without increasing its size.

In order to achieve the above mentioned objects, the cooling apparatus of the present invention has a cooling vessel containing a liquid as a thermal medium that will absorb latent heat of evaporation as it evaporates, thereby decreasing the temperature inside the cooling vessel, and an absorber which absorbs the vapor of the liquid generated in the cooling vessel. The cooling vessel contains a gel refrigerant sealedly enclosed in one or more capsules submerged in the liquid, that will retain its coldness and will impede increase of temperature of the liquid when the operation of the cooling apparatus is suspended. In another embodiment, the cooling vessel has one or more upwardly extending thermally conductive members projecting above the surface of the liquid and the surfaces of the members are covered with liquid soaking material, so that the liquid soaks into the material by capillary action, thereby accelerating its evaporation. In an additional embodiment, the cooling vessel has plural liquid tanks, one arranged on another, so that the total top surface area for evaporation of the liquid is multiplied. In a further embodiment, the cooling vessel contains a plurality of rotatable fins, which are partially dipped in the liquid, for accelerating the evaporation of the liquid.

BRIEF DESCRIPTION OF THE DRAWINGS

FIG. 4 is a table showing the open-close states of five different shutoff valves used in the adsorption cooling apparatus of the present invention;

FIG. 20($a$) and FIG. 20($b$) show a basic principle of a prior known single-adsorber type adsorption cooling system; and FIG. 21 shows a basic principle of a prior known dual-adsorber type adsorption cooling system.

DESCRIPTION OF THE PREFERRED EMBODIMENTS

Figure 1:
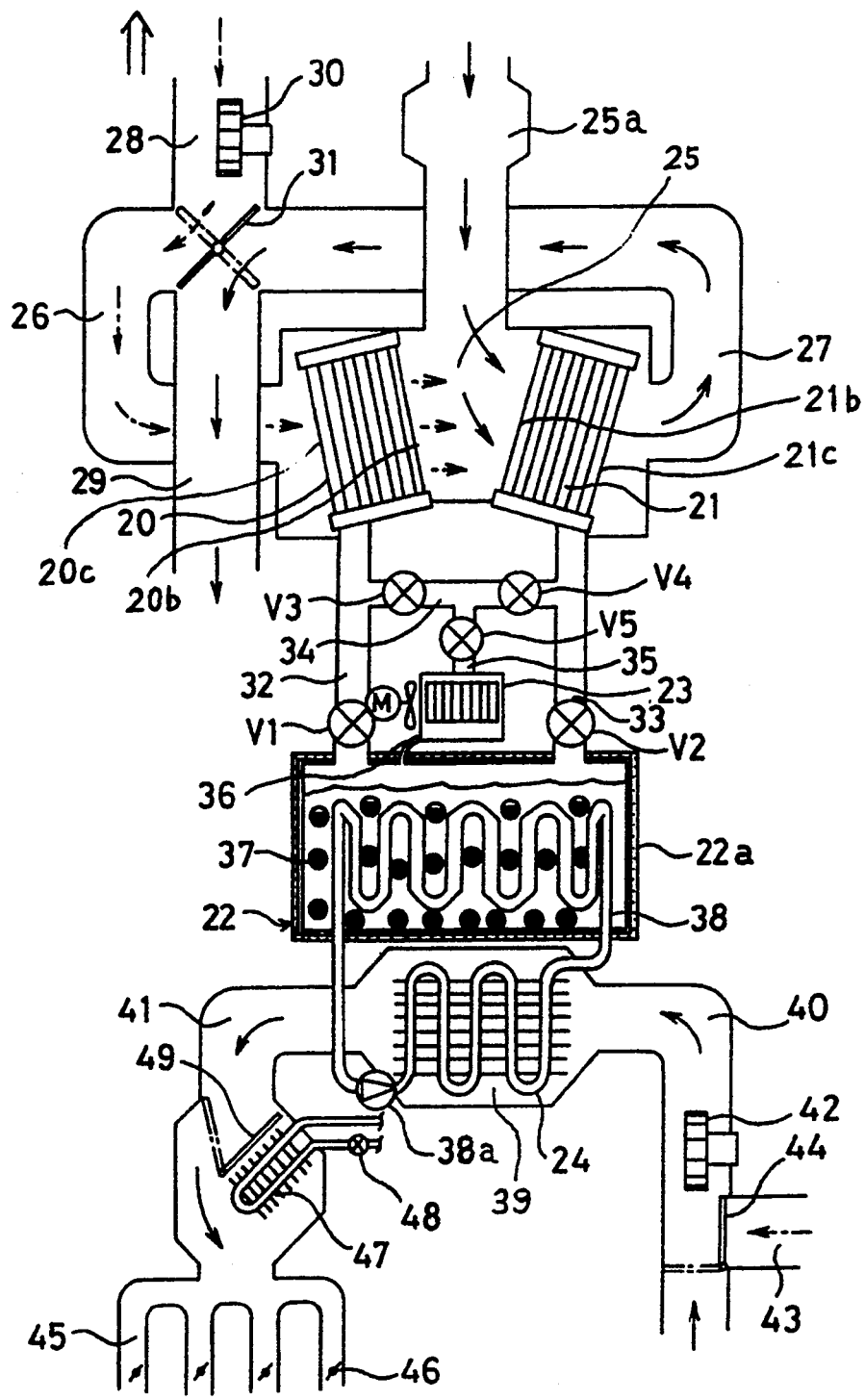
FIG. 1 is a block diagram representing an adsorption cooling apparatus for an automobile having an improved cooling vessel according to the present invention.
Figure 2:
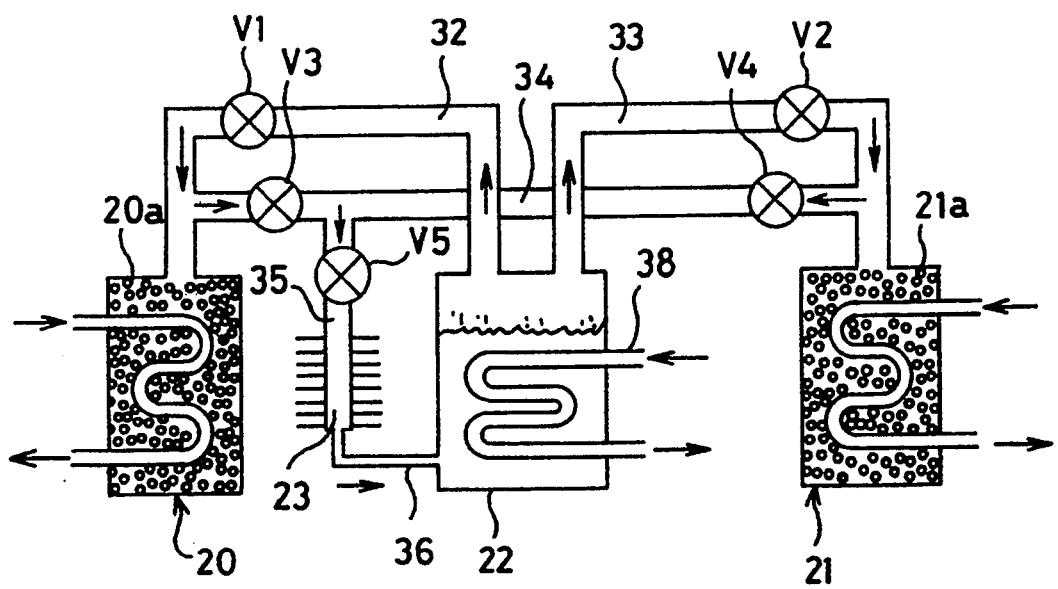
FIG. 2 is a block diagram, in a simplified form, of a substantial part of the adsorption cooling apparatus.

FIG. 1 is a block diagram representing a dual-adsorber type adsorption cooling apparatus for an automobile having an improved cooling vessel according to the present invention and FIG. 2 is a block diagram, in a simplified form, of a substantial part of the dual-adsorber type adsorption cooling apparatus.

In FIGS. 1 and 2, numeral 20 and 21 are a first adsorber and a second adsorber, respectively, having adsorbents 20$a$ and 21$a$ (not shown), respectively, therein. (In FIG. 1, the first and the second adsorbers 20, 21 are shown in abbreviated detail.) Numeral 20$b$, 20$c$ are a first side and a second side, respectively, of the first adsorber 20, and 21$b$, 21$c$ are a first side and a second side, respectively, of the second adsorber 21. Numeral 22 is an improved cooling vessel, according to the present invention, which houses water as an adsorption medium (adsorbate) and units of encapsulated gel refrigerant 37. Numeral 23 is a condenser and 24 is a heat exchanger for the air-conditioning of the vehicle compartment. Numeral 25 represents a central plenum, 25$a$ an exhaust gas inlet passage, 26 a first intermediate passage, 27 a second intermediate passage, 28 an air inlet passage, and 29 an exhaust passage.

The exhaust gas inlet passage 25$a$ communicates with the central plenum 25. The central plenum 25 communicates with the first intermediate passage 26 on one side through the first adsorber 20, and with the second intermediate passage 27 on the other side through the second adsorber 21.

Although not shown in detail, each of the first and the second adsorbers 20, 21 is actually constructed as a heat exchanger comprising a bundle of adsorber tubes brazed to a header at each end, and the adsorbent, such as zeolite, is housed in the adsorber tubes, so that air or gas can pass through the adsorbers 20, 21 for an efficient heat exchange. The first adsorber 20 and the second adsorber 21 are disposed with the central plenum 25 intervening therebetween and the central plenum 25 faces the exhaust gas inlet passage 25a which is connected to the exhaust outlet of the vehicle engine (not shown). The first and the second adsorbers 20, 21 are arranged such that their first sides 20b, 21b oppose each other and both the fist sides 20b, 21b also face the exhaust gas inlet passage 25a at an angle, as shown in FIG. 1. The second sides 20c, 21c of the first and the second adsorbers 20, 21 face the ends of the first intermediate passage 26 and the second intermediate passage 27, respectively. Other ends of the first and the second intermediate passages 26, 27 meet each other at a four-way intersection where the air inlet passage 28 and the exhaust passage 29 also meet. The other end of the air inlet passage 28 is open to the advancing direction of the vehicle (indicated in the double-lined arrow in FIG. 1), while the other end of the exhaust passage 29 opens in the opposite direction, so that the air supply and the exhaust may be accomplished effectively. A blower 30 for forced air supply is provided inside the air inlet passage 28. Further, a switching flap 31 is provided at the four-way intersection. When the switching flap 31 is set to the position shown by solid lines in FIG. 1, the first intermediate passage 26 communicates with the air inlet passage 28 and the second intermediate passage 27 communicates with the exhaust passage 29, and when the flap 31 is set to the other position (shown by broken lines), the first intermediate passage 26 communicates with the exhaust passage 29 and the second intermediate passage 27 communicates with the air inlet passage 28.

The external surface of the cooling vessel 22 is covered by a thermal shield 22a. A first adsorbate outgoing passage 32 is provided between the first adsorber 20 and the cooling vessel 22 and a second adsorbate outgoing passage 33 is provided between the second adsorber 21 and the cooling vessel 22, so that the cooling vessel 22 can communicates with the first adsorber 20 via the first adsorbate outgoing passage 32 and with the second adsorber 21 via the second adsorbate outgoing passage 33. The first and the second adsorbate outgoing passages 32, 33 are provided with shutoff valves V1 and V2, respectively. Although the present example uses water as the adsorption medium (adsorbate) housed in the cooling vessel 22, it is also possible to use other adsorption media such as alcohol or other liquids. A bypass passage 34, having shutoff valves V3, V4, is provided between the first and the second adsorbers 20 and 21 so that the first and the second adsorbers 20 and 21 can communicate with each other directly via the bypass passage 34 when the valves V3, V4 are opened. An adsorbate return passage 35, having a shutoff valve V5, is provided between the bypass passage 34 and the condenser 23. One end of the adsorbate return passage 35 is connected to the bypass passage 34 between the valve V3 and the valve V4, so that the condenser 23 and the bypass passage 34 between the shutoff vales V3 and V4 communicate with each other when the valve 5 is opened. The bypass passage 34 can be regarded as a part of the adsorbate return passage 35 in terms of function. The condenser 23 is also connected with the cooling vessel 22 via a small-diameter condensation passage 36. The cross sectional area of flow in each passage is set so that the sectional areas of flow of the bypass passage 34 and the adsorbate return passage 35 are about 50% of the sectional area of flow of the first and the second adsorbate outgoing passages 32, 33, and the sectional area of flow of the condensation passage 36 is about 0.6% of the sectional area of flow of the bypass passage 34 and the adsorbate return passage 35.

The heat exchanger 24 is connected to a cooling pipe 38 which is in thermal contact with the water inside the cooling vessel 22 so that a thermal medium such as water or brine is made to circulate through the cooling pipe 38 between the cooling vessel 22 and the heat exchanger 24 by means of a pump 38a provided in the cooling pipe 38. The heat exchanger 24 is placed in a heat exchange chamber 39 which communicates with a vehicle room air intake blower passage 40 at one end and an exhaust blower passage 41 at the other end in a construction that is known in an automobile air-conditioning apparatus as described next.

That is, a blower 42 is provided in the intake blower passage 40, while an external air intake 43 branches off the intake blower passage 40 with a flap 44, so that the inlet of the air intake blower passage 40 can be switched to the external air intake 43 by turning the flap 44 to the position shown by broken lines. The exhaust blower passage 41 branches into plural exhaust openings 45 which are provided at places in the vehicle compartment such as on or under the dashboard. A louver 46 is provided in each of the exhaust openings 45. A heating pipe 47, which is connected to the engine radiator (not shown), is provided in the exhaust blower passage 41 and is used for the purpose of heating or demoisturizing of the air in the vehicle compartment, if and when the air in the compartment should be heated rather than cooled. The heating pipe 47 has a shutoff valve 48. By opening the valve 48, the heated engine radiator coolant circulates through the heating pipe 47 so as to heat the air in the exhaust air passage 41. A deflector flap 49 is provided in the exhaust blower passage 41 on the upstream side of the heating pipe 47, so that the amount of the air passing through the heating pipe 47 can be regulated by setting the deflector flap 49 to a proper angle.

In the construction described above, when, for example, the adsorption process is performed at the first adsorber 20 and the desorption process at the second adsorber 21, the switching flap 31 is set to the position illustrated by solid lines. Then, while the high temperature exhaust gas is supplied from the exhaust gas intake passage 25a into the central plenum 25 between the first and the second adsorbers 20 and 21, the external low temperature air entering from the external air intake passage 28 is supplied to the first adsorber 20 via the first intermediate passage 26 as shown by the broken line arrows. The air passes through the first adsorber 20 from its second side 20c to the first side 20b and advances toward the opposing second adsorber 21 in the central plenum 25, while confluxing with the high temperature exhaust gas having entered from the exhaust gas intake passage 25a. Therefore, the flow of the nigh temperature exhaust gas is deflected toward the second adsorber 21 by the air having entered the central plenum through the first adsorber 20, and, therefore, a blend of the high temperature exhaust gas and the air passes through the second adsorber 21 from its first side 21b to the second side 21c, thereby heating the second adsorber 21. The blend of the gas and the air having passed the second adsorber 21 is exhausted externally via the second intermediate passage 27 and the exhaust passage 29, as illustrated by solid line arrows.

Since the first side 21b of the second adsorber 21 is facing the exhaust gas intake passage 25a at an angle, the high temperature exhaust gas from the exhaust gas intake passage 25a smoothly enters the second adsorber 21.

On the other hand, the low temperature air supplied to the first adsorber 20 cools the first adsorber 20 and picks up an adsorbing heat (sensible heat) from the first adsorber 20 while passing therethrough. Thus, the adsorption heat generated in the first adsorber 20 is taken by the air from the first adsorber 20 and is utilized to heat the second adsorber 21. This is a utilization of otherwise waste heat and, therefore, it substantially contributes to the increase of the system COP.

The heating efficiency of the second adsorber 21 decreases as the flow velocity of the gas passing the second adsorber 21 decreases. On the other hand, since the amount of the exhaust gas entering from the exhaust gas intake passage 25a varies depending on the running conditions of the vehicle engine, such as its revolution speed, the total amount of the blend of the exhaust gas and the air passing through the second adsorber 21 is controlled by a control apparatus that is not illustrated. That is, when the amount of the gas in the exhaust gas intake passage 25a decreases, the revolution speed of the blower 30 is increased to increase the amount of the air in the air intake passage 28 and keep the total amount of the air and the exhaust gas passing through the second adsorber approximately constant.

When the processes of the first and the second adsorbers 20, 21 are the reverse of what has been described, the first adsorber 20 will be neared and the second adsorber 21 will be cooled by setting the switching flap 31 to the position illustrated by broken lines. At that time, the flow directions of the air or the blend of the air and the exhaust gas in both the first intermediate passage 26 and the second intermediate passage 27 will be opposite to the directions indicated by the broken line arrows and the solid line arrows, respectively.

Next, the operation of the adsorption cooling apparatus, particularly the functions of the first adsorber 20, the second adsorber 21 and the cooling vessel 22, will be explained in reference to FIGS. 2 and 3. Parts of the construction shown in FIG. 2 are illustrated in different forms from the forms shown in FIG. 1 for ease of explanation.

Figure 3:
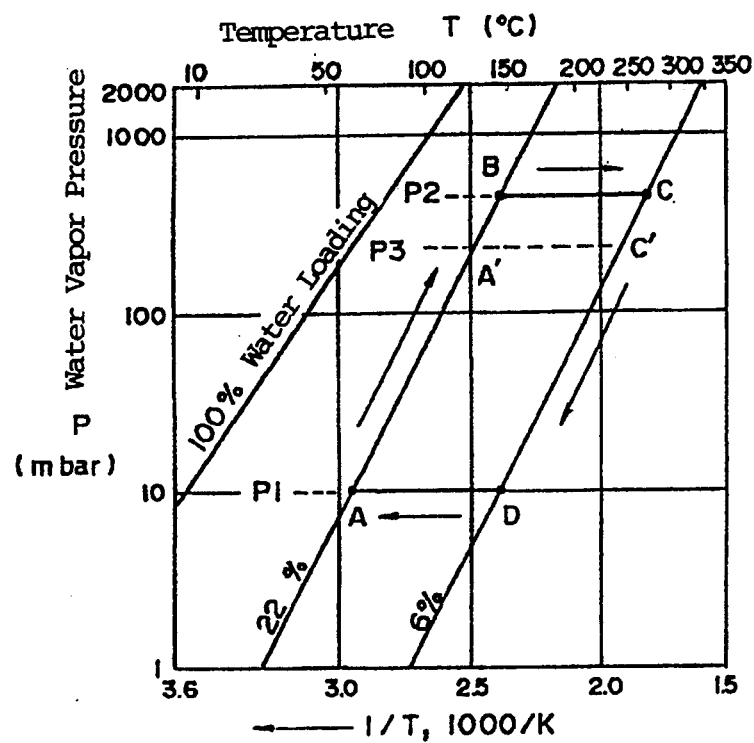
FIG. 3 shows an idealized adsorption-desorption cycle on a P-1/T diagram.

FIG. 3 shows an idealized adsorption-desorption cycle on a P-1/T diagram for an example of the vapor pressures and the vapor temperatures inside the adsorbers. The numeric values described below and shown in FIG. 3 are for explanation purposes.

Referring to FIGS. 2 and 3, when the adsorption process is to be performed in the first adsorber 20 and the desorption process in the second adsorber 21, firstly the valves V1, V2, V3 and V4 are closed and the valve V5 is opened. By these means, the temperature inside the first adsorber 20 is cooled to 150° C. on the water isostere for a water loading of 6% (phase C' to D in FIG. 3), and the temperature inside the second adsorber 21 is heated to 150° C. on the water isostere for a water loading of 22% (phase A' to B). At this time, vapor pressure P1 inside the first adsorber 22 becomes 10 mbar, and the vapor pressure P2 inside the second adsorber 21 becomes 450 mbar. P3 is the mean value of P1 and P2. Next, the valves V1, V4 and V5 are opened, while the valves V2 and V3 are kept closed. By these means, the water inside the cooling vessel 22 evaporates under the pressure of 10 mbar, flows to the first adsorber 21 via the first adsorbate outgoing passage 32, and is adsorbed by the adsorbent 20a in the first adsorber 20. At this time, the heat inside the cooling vessel 22 is lost because of the latent heat of evaporation of the water. Then, by keeping cooling the inside of the first adsorber 20, the water inside the cooling vessel 22 continuously evaporates and is adsorbed by the adsorbent 20a, and the inside of the first adsorber 20 is ultimately cooled to 70° C. (phase D to A). On the other hand, the inside of the second adsorber 21 is heated to 280° C. under the pressure of 450 mbar (phase B to C), and the water adsorbed in the adsorbent 21a of the second adsorber 21 is now desorbed and separated from the adsorbent 21a in a vapor state and flows through the bypass passage 34 and the adsorbate return passage 35 into the condenser 23. Then, the water vapor is condensed in the condenser 23 into liquid water, passes through the condensation passage 36 and returns to the cooling vessel 22. This operation occurs in periods of one minute to one day.

The reason for the sectional areas of flow in the first and the second adsorbate outgoing passages 32, 33, the adsorbate return passage 35 and the condensation passage 36 being made successively smaller is that the density of the vapor increases in that sequence (it is in the state of liquid in the condensation passage 36). It is particularly desirable that the quantity of the water passing in the condensation passage 36 is equivalent to the quantity of the vapor evaporating out from the cooling vessel 22.

At the point in time when the above processes are completed, the inside of the second adsorber 21 where the desorption process occurred has reached a high temperature of about 280° C., and the inside of the first adsorber 20 where the adsorption process was completed has reached a low temperature of about 70° C. Before the first and the second adsorbers 20, 21 are switched to the processes opposite to those just described, the difference in enthalpy (heat content) between the first adsorber 20 and the second adsorber 21 is utilized in order not to waste the heat by means of an intermediate process, which will be described next.

That is, only the valves V3, V4 in the bypass passage 34 are now opened while the valves V1, V2, V5 are closed so that the first adsorber 20 and the second adsorber 21 are directly communicated with each other through the bypass passage 34 without involving the cooling vessel 22 therebetween. By these means, a portion of the heat in the second adsorber 21 shifts into the first adsorber 20, so that the temperature in the first adsorber 20 in which the desorption process will next be carried out is increased while the temperature inside the second adsorber 21 in which the adsorption process will next be carried out is decreased. Thus, the difference in enthalpy between the first adsorber 20 and the second adsorber 21 is kept from becoming a waste heat and is utilized to boost the COP of the system. This intermediate process is done only on the order of 1% to 5% of the time required for completing the above described adsorption-desorption processes. Although the intermediate process cannot be plotted in the diagram in FIG. 3, it may be considered to be a portion of the adsorption-desorption processes.

Thus, the water inside the cooling vessel 22 and the coolant in the pipe 38 are continuously cooled by periodically repeating the process cycle of adsorption/-desorption-intermediate-desorption/adsorption-intermediate-... in the first and the second adsorbers 20, 21 alternatively and in parallel. At that time, each unit of the gel refrigerant 37 in the cooling vessel 22 is also cooled.

FIG. 4 shows the open-close states of the shutoff valves V1, V2, V3, V4 and V5 for a complete cycle of the above described processes.

Now, the air-conditioning operation of the vehicle compartment will be explained in reference to FIG. 1.

As the inside of the cooling vessel 22 is cooled as explained above, the pipe 38 inside the cooling vessel 22 is cooled. Then, the coolant whose temperature is lowered in the cooling vessel 22 flows into the section of the pipe 38 in the heat exchanger 24. On the other hand, the air taken from inside the vehicle compartment and introduced to the intake blower passage 40 is blown to the heat exchanger 24 and is cooled therein. The air having been cooled by the heat exchanger 24 is, then, blown back to the vehicle compartment through the exhaust openings 45.

When necessary, by setting the flap 44 to the position shown by broken lines, the external air rather than the air from the vehicle compartment may be introduced to the intake blower passage 40. If desired, the function of the heat exchanger 24 may be disabled by shutting off the pump 38a and the air in the exhaust blower passage 41 may be heated rather than cooled by the heating pipe 47 by opening the valve 48 and setting the deflector flap 49 to a proper position.

In this embodiment, the cooling apparatus is of an adsorbing type having adsorbers 20, 21. As an alternative embodiment, the cooling apparatus may have, instead of adsorbers, a vapor absorbing vessel such as an vacuum tank.

Now, the details of the inside of the cooling vessel 22, according to the present invention, will be explained.

Figure 5A:
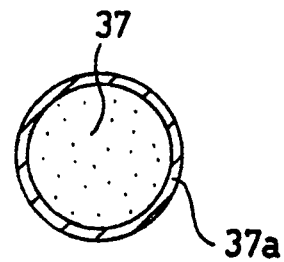
FIGS. 5($a$), 5($b$) and 5($c$) show a gel refrigerant and capsules containing the gel refrigerant used in a cooling vessel of the cooling apparatus.
Figure 5B:
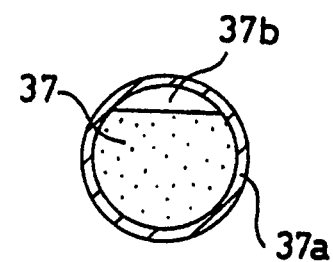
Figure 5C:
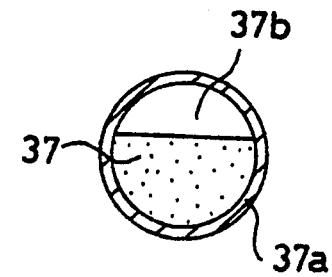

Referring to FIGS. 1, 5(a), 5(b) and 5(c), units of encapsulated gel refrigerant 37 are disposed in the cooling vessel 22. The gel refrigerant 37 is made of, for example, a conjugate compound of water and halogenated carbon. The refrigerant freezes at a temperature of about 0° C. to 10° C. The gel refrigerant 37 having freezed absorbs latent heat from its surroundings when it melts. Each unit of the gel refrigerant 37 is sealedly enclosed in a spherical capsule 37a made of polyethylene. In this particular embodiment, there are three ways to hold the gel refrigerant 37 in the capsule 37a in terms of quantity of the gel refrigerant 37 per capsule. One is, as shown in FIG. 5(a), that the capsule 37a is completely filled with the gel refrigerant 37; the second is, as shown in FIG. 5(b), that a little empty space 37b is left in the capsule 37a; and the third way is, as shown in FIG. 5(c), that an even more empty space 37b is left in the capsule 37a. The cooling vessel 22 contains approximately an equal number of each of the three kinds of the capsules 37a, each kind containing equal quantity of the gel refrigerant 37 therein. On the other hand, the buoyancy of each of the capsules 37a in the water depends on the quantity of the gel refrigerant 37 or the volume of the empty space 37b therein. Therefore, as shown in FIG. 1, the capsules 37a in the water in the cooling vessel 22 separate themselves into three groups in terms of depth in the water according to the quantities of the gel refrigerant 37a contained. The first group containing the least quantity of the gel refrigerant 37, stays near the surface of the water, the second group containing the intermediate quantity thereof stays at a middle depth, and the third group containing the largest quantity thereof goes to the bottom floor of the cooling vessel 22.

When the cooling operation is temporarily suspended while the apparatus is intermittently operated, although the cooling action by the evaporation of the water is stopped, the water in the cooling vessel 22 is maintained cool by the gel refrigerant 37. Therefore, a desirable cooling effect will be obtained when the operation of the cooling apparatus is resumed. In other words, the gel refrigerant 37 causes to increase the thermal capacity of the cooling vessel 22 without having a large quantity of the water in the cooling vessel 22. This means that the size of the cooling vessel 22 can be made small for a unit thermal capacity and the overall size of the cooling apparatus can, therefore, also be made compact.

As explained before, since there are plural groups of the capsules 37a of the gel refrigerant 37 in terms of the quantity of the gel refrigerant 37 enclosed in each capsule 37a, which determines the buoyancy, all of the capsules 37a never stay congested at an even depth, but different groups of the capsules 37a stay at respective different depths in the water in the cooling vessel 22. Therefore, the heat exchange between the gel refrigerant 37 and the water can be made efficiently. In addition, any undesirable waving or movement of the water in the cooling vessel 22, resulting from the movements of the vehicle, will be suppressed because of the existence of the capsules 37a in the water.

FIGS. 6(a), 6(b), 7(a), 7(b), 8(a), 8(b), 9(a), 9(b), 10(a), 10(b), 11(a), 11(b), 12(a), 12(b), 13(a) and 13(b) show various alternative forms and embodiments of the gel refrigerants and their capsules.

Figure 6A:
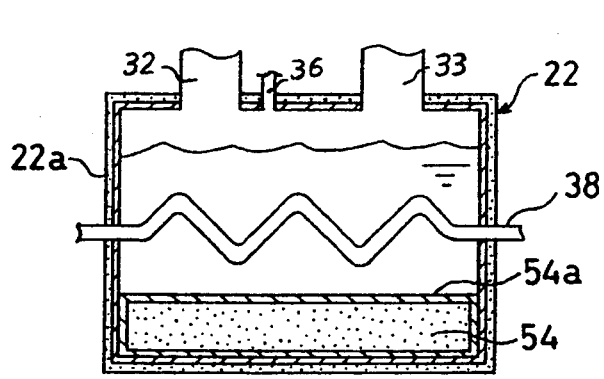
FIGS. 6($a$) and 6($b$) are respectively a semi diagrammatical vertical sectional view of a cooling vessel in a first alternative form and a perspective view of the capsule of the gel refrigerant contained in the cooling vessel.
Figure 6B:
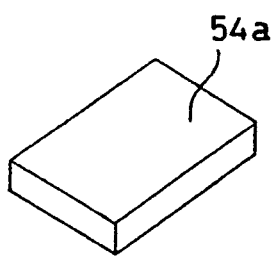

In FIGS. 6(a) and 6(b), a gel refrigerant 54 is sealedly enclosed in a capsule 54a having a flat rectangular block form and is disposed on the bottom floor of the cooling vessel 22.

Figure 7A:
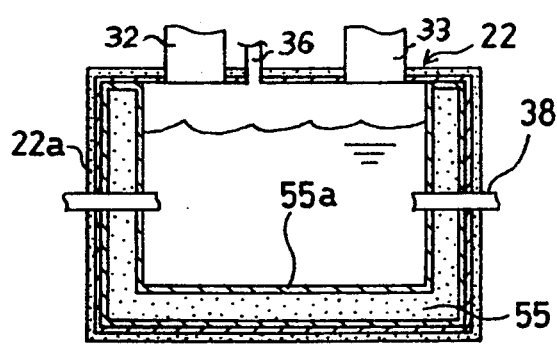
FIGS. 7($a$) and 7($b$) are respectively a semi diagrammatical vertical sectional view of a cooling vessel in a second alternative form and a perspective view of the capsule of the gel refrigerant contained in the cooling vessel.
Figure 7B:
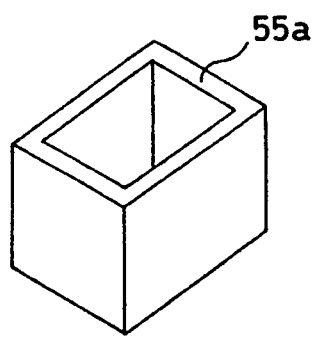

In FIGS. 7(a) and 7(b), a gel refrigerant 55 is sealedly enclosed in a box-shaped capsule 55a and is disposed on the bottom floor in contact with the sidewalls of the cooling vessel 22.

Figure 8B:
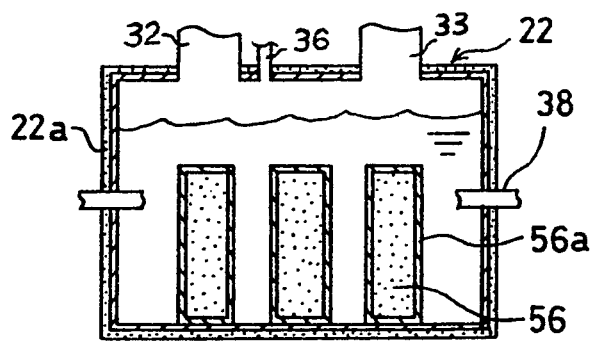
FIGS. 8($a$) and 8($b$) are respectively a semi diagrammatical vertical sectional view of a cooling vessel in a third alternative form and a perspective view of the capsules of the gel refrigerant contained in the cooling vessel.
Figure 8A:
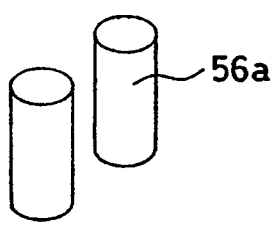

In FIGS. 8(a) and 8(b), a gel refrigerant 56 is sealedly enclosed in a plurality of cylindrical capsules 56a and the cylindrical capsules 56a are vertically and fixedly disposed on the bottom floor of the cooling vessel 22 spaced from each other.

Figure 9:
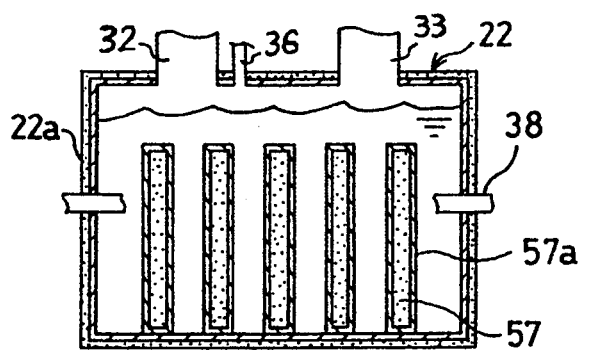
FIGS. 9($a$) and 9($b$) are respectively a semi diagrammatical vertical sectional view of a cooling vessel in a fourth alternative form and a perspective view of the capsules of the gel refrigerant contained in the cooling vessel.
Figure 9:
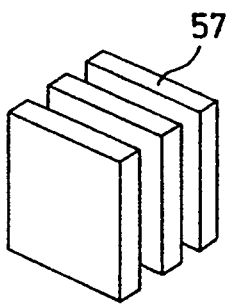

In FIGS. 9(a) and 9(b), a gel refrigerant 57 is sealedly enclosed in a plurality of capsules 57a, each having a flat rectangular form, and the capsules 57a are vertically and fixedly disposed on the bottom floor of the cooling vessel 22 spaced from each other.

Figure 10:
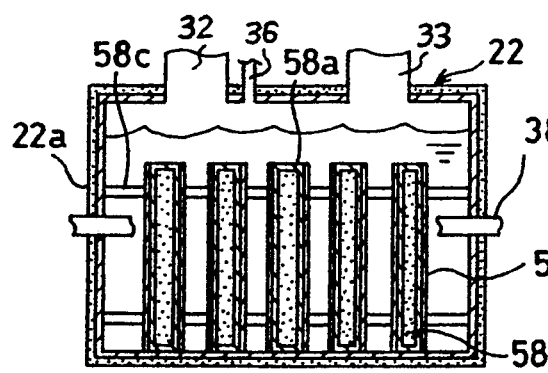
FIGS. 10($a$) and 10($b$) are respectively a semi diagrammatical vertical sectional view of a cooling vessel in a fifth alternative form and a perspective view of the capsules of the gel refrigerant contained in the cooling vessel.
Figure 10:
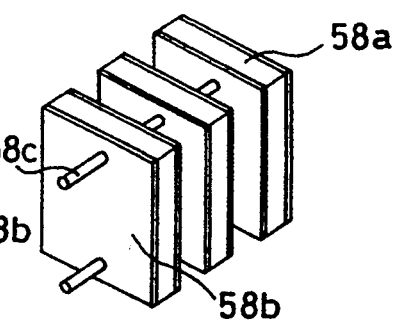

In FIGS. 10(a) and 10(b), a gel refrigerant 58 is sealedly enclosed in a plurality of capsules 58a, each having a flat rectangular form, and the capsules 58a are vertically and fixedly disposed on the bottom floor of the cooling vessel 22. In this alternative embodiment, each capsule 58a is interposed between a pair of thermally conductive plates 58b in contact therewith. Furthermore, between each pair of the thermally conductive plates 58b facing each other and between the thermally conductive plates 58b and the respective sidewalls of the cooling vessel 22 facing each other are respectively disposed pairs of thermally conductive rods 58c vertically spaced apart from each other. In this configuration, the capsules 58a are also structurally supported by the thermally conductive plates 58b and the thermally conductive rods 58c.

Figure 11:
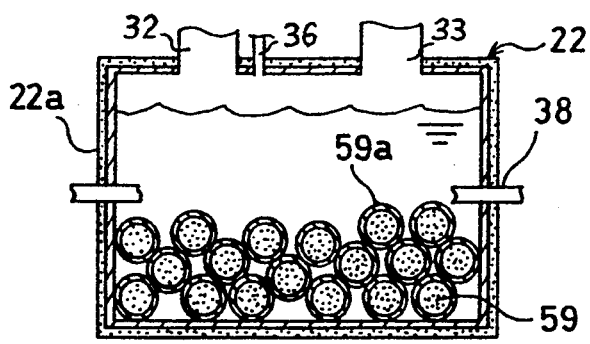
FIGS. 11($a$) and 11($b$) are respectively a semi diagrammatical vertical sectional view of a cooling vessel in a sixth alternative form and a perspective view of the gel refrigerant contained in the cooling vessel.
Figure 11:
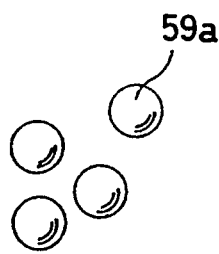

In FIGS. 11(a) and 11(b), a gel refrigerant 59 is sealedly enclosed in a plurality of spherical capsules 59a and the spherical capsules 59a are freely placed on the bottom floor of the cooling vessel 22 in a stacked state.

Figure 12A:
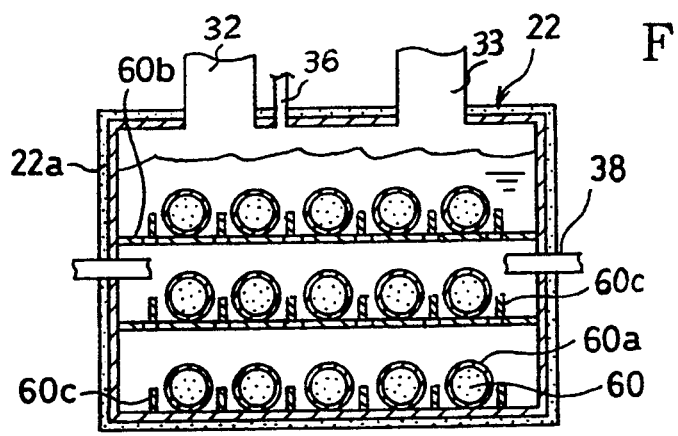
FIGS. 12($a$) and 12($b$) are respectively a semi diagrammatical vertical sectional view of a cooling vessel in a seventh alternative form and a perspective view of the capsules of the gel refrigerant contained in the cooling vessel.
Figure 12B:
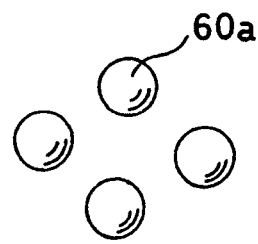

In FIGS. 12(a) and 12(b), a gel refrigerant 60 is sealedly enclosed in a plurality of spherical capsules 60a. The capsules 60a are separated into three groups, and the three groups of the capsules 60a are separately and respectively disposed on the bottom floor of the cooling vessel 22 and two separate fiat liquid-passable racks 60b that are fixed to the cooling vessel 22 and are vertically spaced from each other in the cooling vessel 22. Movement of each of the spherical capsules 60a is restricted by barriers 60c so that the capsules 60a are allowed to roll by themselves by the movements of the vehicle employing the cooling apparatus for an effective heat exchange with the water but are prevented from moving excessively.

Figure 13A:
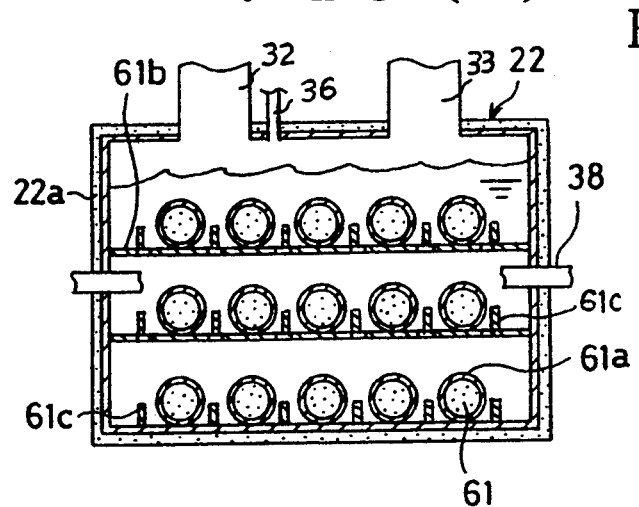
FIGS. 13($a$) and 13($b$) are respectively a semi diagrammatical vertical sectional view of a cooling vessel in a eighth alternative form and a perspective view of the capsules of the gel refrigerant contained in the cooling vessel.
Figure 13B:
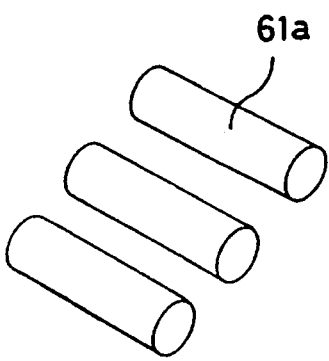

In FIGS. 13(a) and 13(b), a gel refrigerant 61 is sealedly enclosed in a plurality of cylindrical capsules 61a. The capsules 61a are separated into three groups, and the three groups of the capsules 61a are separately and respectively disposed on the bottom floor of the cooling vessel 22 and two separate flat liquid-passable racks 61b that are fixed to the cooling vessel 22 and are vertically spaced from each other in the cooling vessel 22. Movement of each of the cylindrical capsules 61a is restricted by barriers 61c so that the capsules 61a are allowed to roll by themselves by the movements of the vehicle for an effective heat exchange with the water but are prevented from moving excessively.

Figure 14:
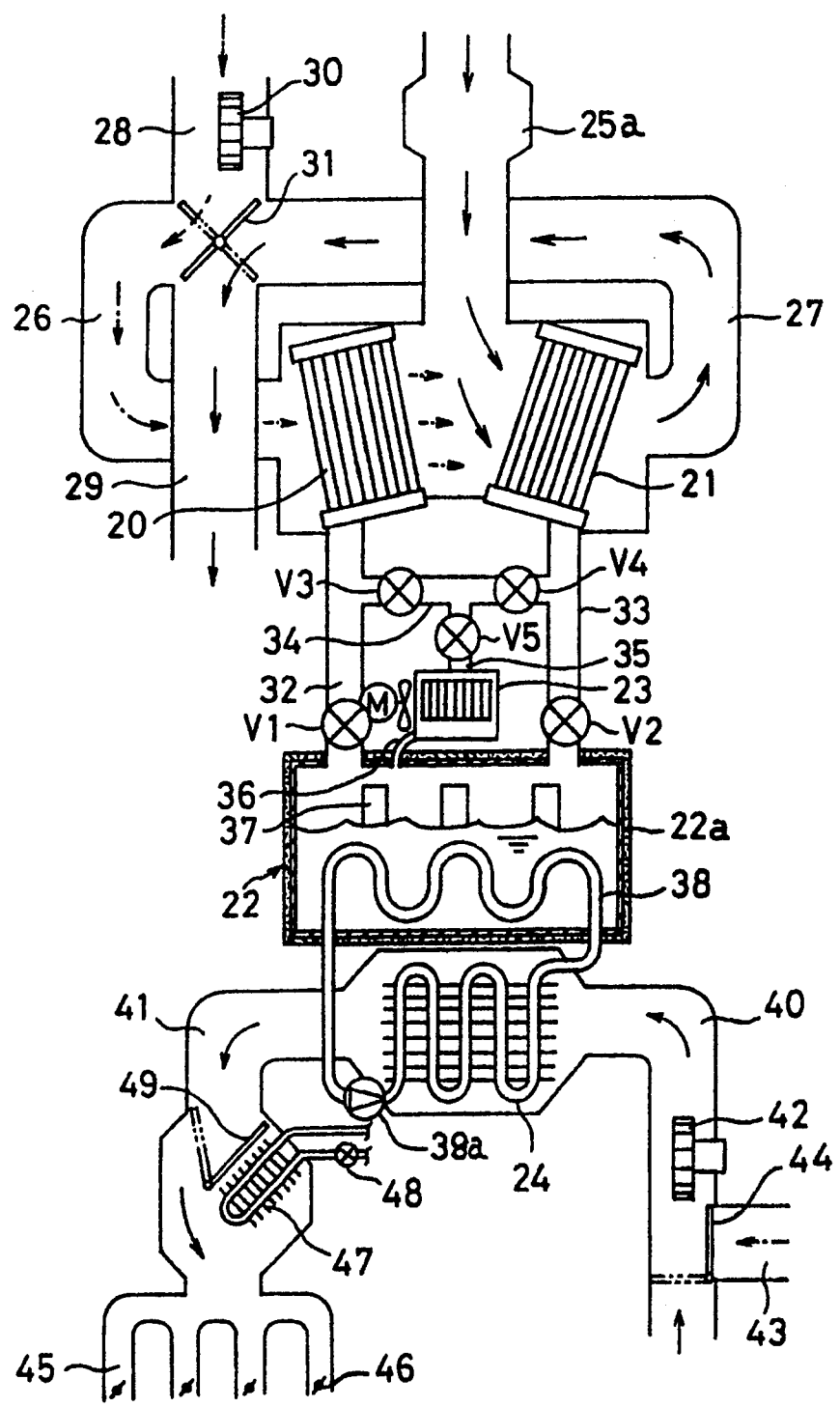
FIG. 14 shows an adsorption cooling apparatus of a second embodiment of the present invention, whose cooling vessel contains upwardly extending members partially submerged in the liquid.

FIG. 14 shows an adsorption cooling apparatus of the second embodiment of the present invention whose cooling vessel features an increased efficiency in the evaporation of the water.

The basic construction and the basic function of the adsorption cooling apparatus of the second embodiment are the same as those of the first embodiment, and the like reference characters in all of the Figures pertaining to the first and the second embodiments denote the like elements. Therefore, the explanation on the second embodiment will be made only on those elements which are new or different from those of the first embodiment.

Figure 15:
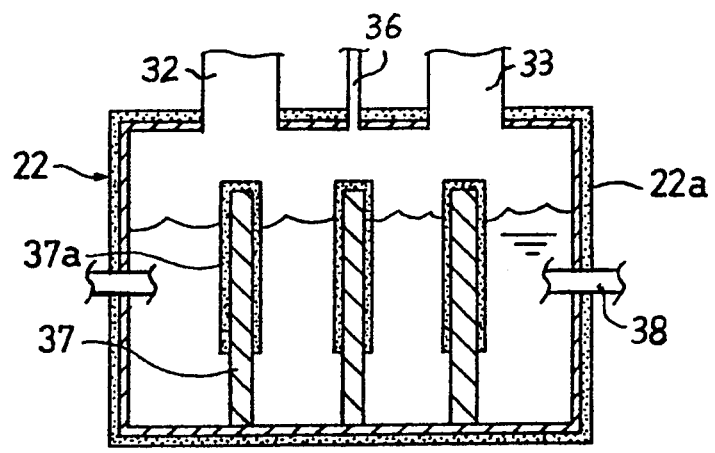
FIG. 15 is a semi diagrammatical vertical sectional view of the cooling vessel of the cooling apparatus of the second embodiment.

Referring to FIGS. 14 and 15, the cooling vessel 22 contains a plurality of vertically extending members 37. These members 37 are made of a columnar or rod-shaped metal having a good thermal conductivity, such as aluminum or copper, and are fixed to the bottom floor of the cooling vessel 22. The top sections of the thermally conductive members 37 are above the surface of the water in the cooling vessel 22. Each of the thermally conductive members 37, except of its bottom section, is covered with a liquid-soaking cover material 37a, such as felt or artificial bristle, so that the water soaks into the material 37a.

When the water in the cooling vessel 22 evaporates, the evaporation occurs not only from the surface of the water but also from the cover material 37a above the water surface. Since the members 37 are thermally conductive, as the water held in the cover material 37a evaporates, the members 37 are cooled in their entirety because of the loss of the latent heat caused by the evaporation of the water from the cover material 37a. Therefore, the cooling of the water below its top surface is accelerated through the thermally-conductive members 37.

Furthermore, in the second embodiment, since the water evaporates both from its top surface and from the cover material 37a above the water surface, the total area from which the evaporation occurs is increased without increasing the capacity or size of the cooling vessel 22. Therefore, the cooling efficiency of the cooling apparatus is enhanced.

Figure 16:
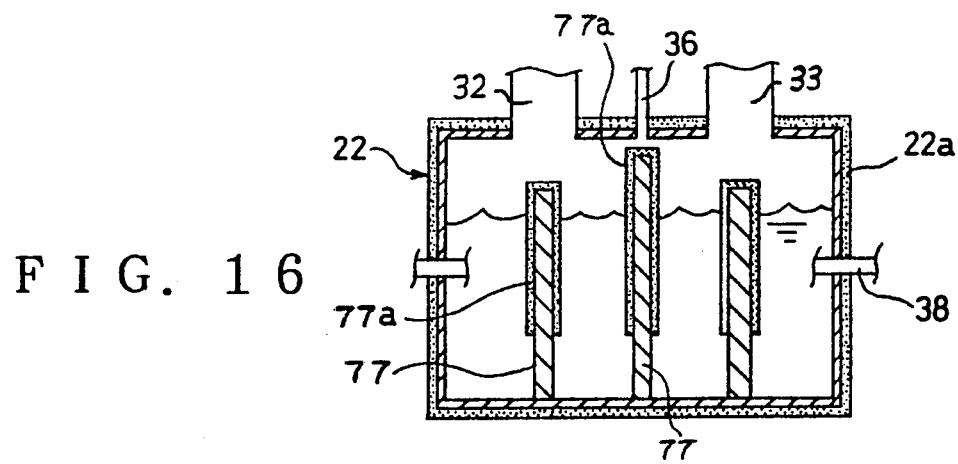
FIG. 16 is a semi diagrammatical vertical sectional view of a cooling vessel for the second embodiment in a first alternative form.
Figure 17:
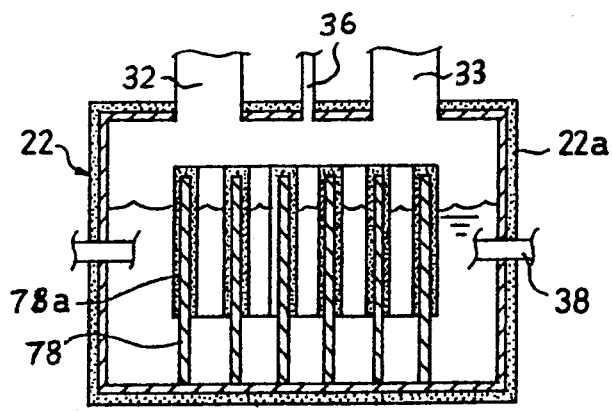
FIGS. 17($a$) and 17($b$) are respectively a semi diagrammatical sectional view of a cooling vessel for the second embodiment in a second alternative form and a perspective view of the vertically extending member used therein.
Figure 17:
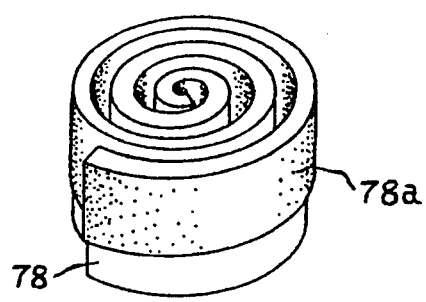

FIGS. 16, 17(a) and 17(b) show alternative forms of the thermally-conductive members and the cover material.

In FIG. 16, one of the three thermally-conductive members 77 is additionally upwardly extended and is disposed directly below the mouth of the condensation passage 36. The cover material 77a additionally covers the extended section of the extended member 77. The cover material 77a normally soaks up the water in the cooling vessel 22 by capillary action. While there is a limitation of height the water can go up in the cover material 77a by capillary action, the cover material 77a disposed directly below the mouth of the condensation passage 36 also directly receives condensed water from the condensation passage 36. Therefore, by placing one of the members 77 directly below the opening of the condensation passage 36 and upwardly extending that member 77, the total area for water evaporation is further increased.

In FIGS. 17(a) and 17(b), a thermally-conductive member 78 has a form of a loosely coiled sheet and a water soaking cover material 78a covers both sides of the member 78 except its bottom section. The member 78 is fixed to the bottom floor of the cooling vessel 22. Functions of the member 78 and the cover material 78a are the same as those of the members 37 and the cover material 37a described above.

Figure 18:
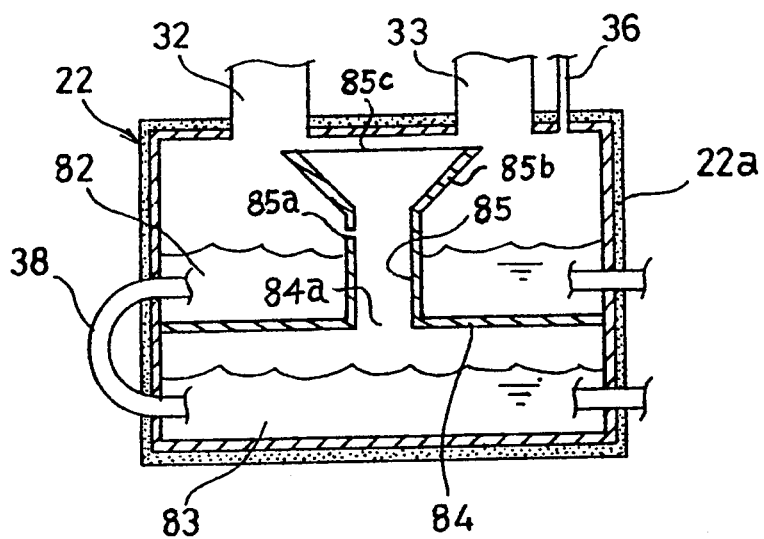
FIG. 18 is a semi diagrammatical vertical sectional view of a cooling vessel of the cooling apparatus of a third embodiment of the present invention.

FIG. 18 diagrammatically shows a section of a cooling vessel of the cooling apparatus of the third embodiment of the present invention.

In FIG. 18, the cooling vessel 22 has an upper water tank 82 and a lower water tank 83 that is disposed under the upper water tank 82. The tanks 82 and 83 are separated up and down by a horizontal divider 84. The divider 84 has an opening 84a in its center. A generally cylindrical riser 85 upwardly extends from the opening 84a of the divider 84 to a level higher than the level of the water surface in the upper water tank 82, so that the empty spaces in the upper and the lower water tanks 82, 83 are communicated with each other through the riser 85. The riser 85 has a small overflow hole 85a and its top section 85b is increasingly widened toward its top opening 85c.

The cooling pipe 38 is arranged so as to go through the water in both the upper water tank 82 and the lower water tank 83. The condensation passage 36 is connected to a proper position of the cooling vessel 22 so that the condensed water from the condensation passage 36 always drops into the upper water tank 82. When the water level in the upper water tank 82 rises and reaches the level of the overflow hole 85a, the excessive water drops down to the lower water tank 83 through the overflow hole 85a. Therefore, the water in the cooling vessel 22 is distributed to the upper water tank 82 and the lower water tank 83, and the total evaporation surface area of the water in the cooling vessel 22 is, therefore, almost doubled as compared with the case of a single tank.

Figure 19:
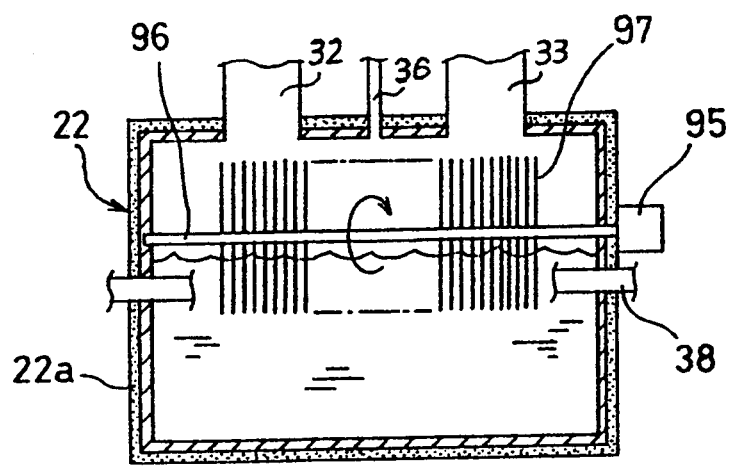
FIG. 19 is a semi diagrammatical vertical sectional view of a cooling vessel of the cooling apparatus of a fourth embodiment of the present invention.

FIG. 19 shows a section of a cooling vessel of the cooling apparatus of the fourth embodiment of the present invention.

In FIG. 19, numeral 95 denotes a motor and 96 denotes a shaft that can be rotated by the motor 95. The shaft 96 is horizontally and rotatably mounted on the cooling vessel 22 inside thereof. A plurality of evenly spaced flat fins 97, arranged in parallel with each other, are perpendicularly fixed to the shaft 96. All of the fins 97 are partially dipped in the water, so that some of the water is picked up by the fins 97 and evaporates above the surface of the water as the fins 97 are rotated by the motor 95. This action causes to accelerate the evaporation of the water in the cooling vessel 22.

It will be understood that various changes and modifications may be made in the above described embodiments which provide the characteristics of the present invention without departing from the spirit and principle thereof particularly as defined in the following claims.

What is claimed is:

1. A cooling apparatus including an improved cooling vessel and a vapor absorber, the cooling vessel containing a liquid as a thermal medium which evaporates therein absorbing latent heat, thereby lowering the temperature in the cooling vessel, the vapor absorber absorbing vapor of the liquid generated in the cooling vessel, the improved cooling vessel containing a plurality of capsules each sealingly enclosing a refrigerant therein, said capsules being submerged in the liquid for exchanging heat with the liquid, said capsules being separated into at least two groups including a first group and a second group, each of the capsules belonging to said first group containing a first quantity of said refrigerant and a first volume of empty space, thereby having a first amount of buoyancy in the liquid, each of the capsules belonging to said second group containing a second quantity of said refrigerant and a second volume of empty space, thereby having a second amount of buoyancy in the liquid, said first quantity of said refrigerant being less than said second quantity, said first volume of empty space being larger than said second volume of empty space, thereby said first amount of buoyancy in the liquid being greater than said second amount of buoyancy, all of the capsules belonging to said first group staying at a first depth in the liquid and all of the capsules belonging to said second group staying at a second depth in the liquid, and said first depth being less than said second depth.

2. A cooling apparatus including an improved cooling vessel and a vapor absorber, the cooling vessel containing a liquid as a thermal medium which evaporates therein absorbing latent heat, thereby lowering the temperature in the cooling vessel, the vapor absorber absorbing vapor of the liquid generated in the cooling vessel, the improved cooling vessel containing a plurality of flat rectangular capsules each sealingly enclosing a refrigerant therein, said capsules being submerged in the liquid for exchanging heat with the liquid, said flat rectangular capsules being vertically and fixedly disposed on a bottom floor of the cooling vessel in parallel with each other, each of said capsules being interposed between a pair of thermally conductive plates in contact therewith, and thermally conductive support members being disposed between each pair of said thermally conductive plates facing each other and between said thermally conductive plates and respective sidewalls of the cooling vessel facing each other.

* * * * *